United States Patent
Fressancourt et al.

(10) Patent No.: US 10,462,708 B2
(45) Date of Patent: Oct. 29, 2019

(54) METHOD AND DEVICE FOR SETTING UP AND MAINTAINING AN INTERNET ACCESS USING A WIRELESS LOCAL AREA NETWORK COMMUNICATION PROTOCOL FROM A MOBILE CLIENT STATION

(71) Applicant: WORLDLINE, Bezons (FR)

(72) Inventors: Antoine Fressancourt, Lille (FR); Tony Ducrocq, Allennes-les-Marais (FR)

(73) Assignee: WORLDLINE, Bezons (FR)

( * ) Notice: Subject to any disclaimer, the term of this patent is extended or adjusted under 35 U.S.C. 154(b) by 0 days.

(21) Appl. No.: 15/757,917

(22) PCT Filed: Sep. 6, 2016

(86) PCT No.: PCT/FR2016/052204
§ 371 (c)(1),
(2) Date: Mar. 6, 2018

(87) PCT Pub. No.: WO2017/042467
PCT Pub. Date: Mar. 16, 2017

(65) Prior Publication Data
US 2018/0343591 A1    Nov. 29, 2018

(30) Foreign Application Priority Data
Sep. 7, 2015    (FR) ..................................... 15 58294

(51) Int. Cl.
*H04W 36/08* (2009.01)
*H04W 36/00* (2009.01)
(Continued)

(52) U.S. Cl.
CPC ........ *H04W 36/0011* (2013.01); *H04W 36/08* (2013.01); *H04W 80/06* (2013.01); *H04W 84/12* (2013.01)

(58) Field of Classification Search
CPC .. H04W 36/0011; H04W 36/08; H04W 84/12
See application file for complete search history.

(56) References Cited

U.S. PATENT DOCUMENTS

2009/0180451 A1* 7/2009 Alpert ............... H04W 72/1215
370/338
2010/0234071 A1* 9/2010 Shabtay ............... H04B 7/0408
455/562.1
(Continued)

FOREIGN PATENT DOCUMENTS

WO    WO 2015/094043 A1    6/2015

OTHER PUBLICATIONS

International Search Report as issued in International Patent Application No. PCT/FR2016/052204, dated Nov. 18, 2016.
(Continued)

*Primary Examiner* — Wei Zhao
(74) *Attorney, Agent, or Firm* — Pillsbury Winthrop Shaw Pittman LLP

(57) ABSTRACT

A method for setting up and maintaining Internet access using a WLAN protocol from a mobile client station, by access points selected in succession, includes setting up a WLAN Internet access by a first selected access point; at that time, opening a first WLAN communication session specific to the first access point; maintaining the Internet access while opening at least one other WLAN communication session specific to at least one other subsequently selected access point. Internet access is maintained in the following way: when the first session is opened, a main communication session is additionally opened using a wide area telecommunication network wireless communication protocol; the opened main session is maintained for as long as one wishes to maintain Internet access; joining the main session as well as each session specific to each selected access point as dependent upon a same unique session identifier.

10 Claims, 4 Drawing Sheets

Figure 1:
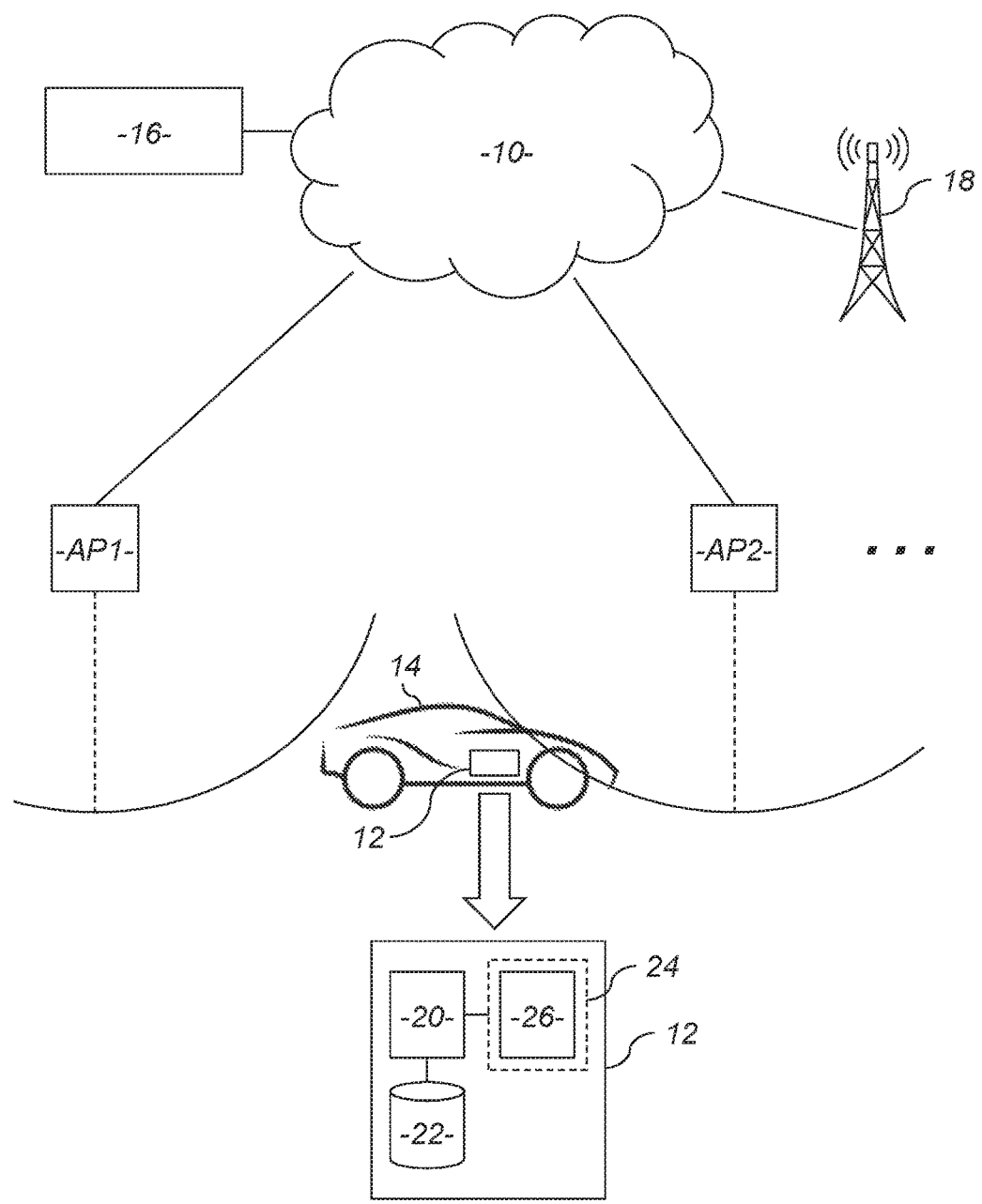

(51) Int. Cl.
  *H04W 80/06* (2009.01)
  *H04W 84/12* (2009.01)

(56) References Cited

U.S. PATENT DOCUMENTS

2013/0170435 A1* 7/2013 Dinan .................... H04L 45/50
                                                370/328
2014/0362765 A1   12/2014 Biswas et al.

OTHER PUBLICATIONS

Paasch, C., et al., "Exploring Mobile/Wifi Handover with Multipath TCP," Cellular Networks: Operations, Challenges, and Future Design, Aug. 2012, pp. 31-36, XP058008082.

* cited by examiner

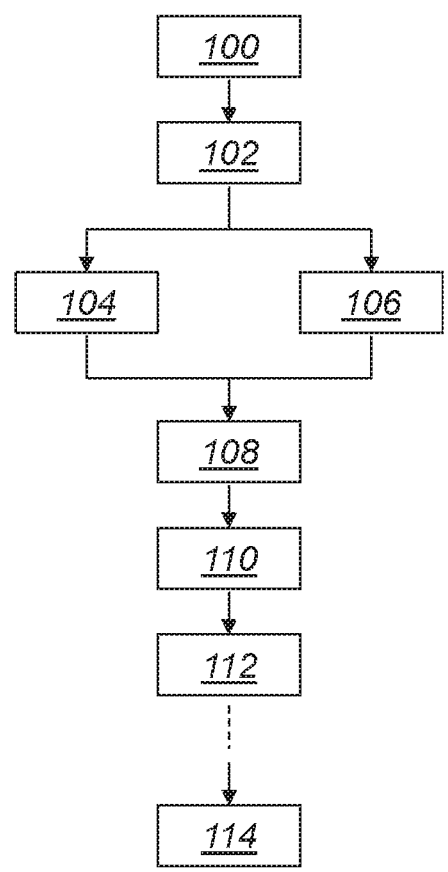

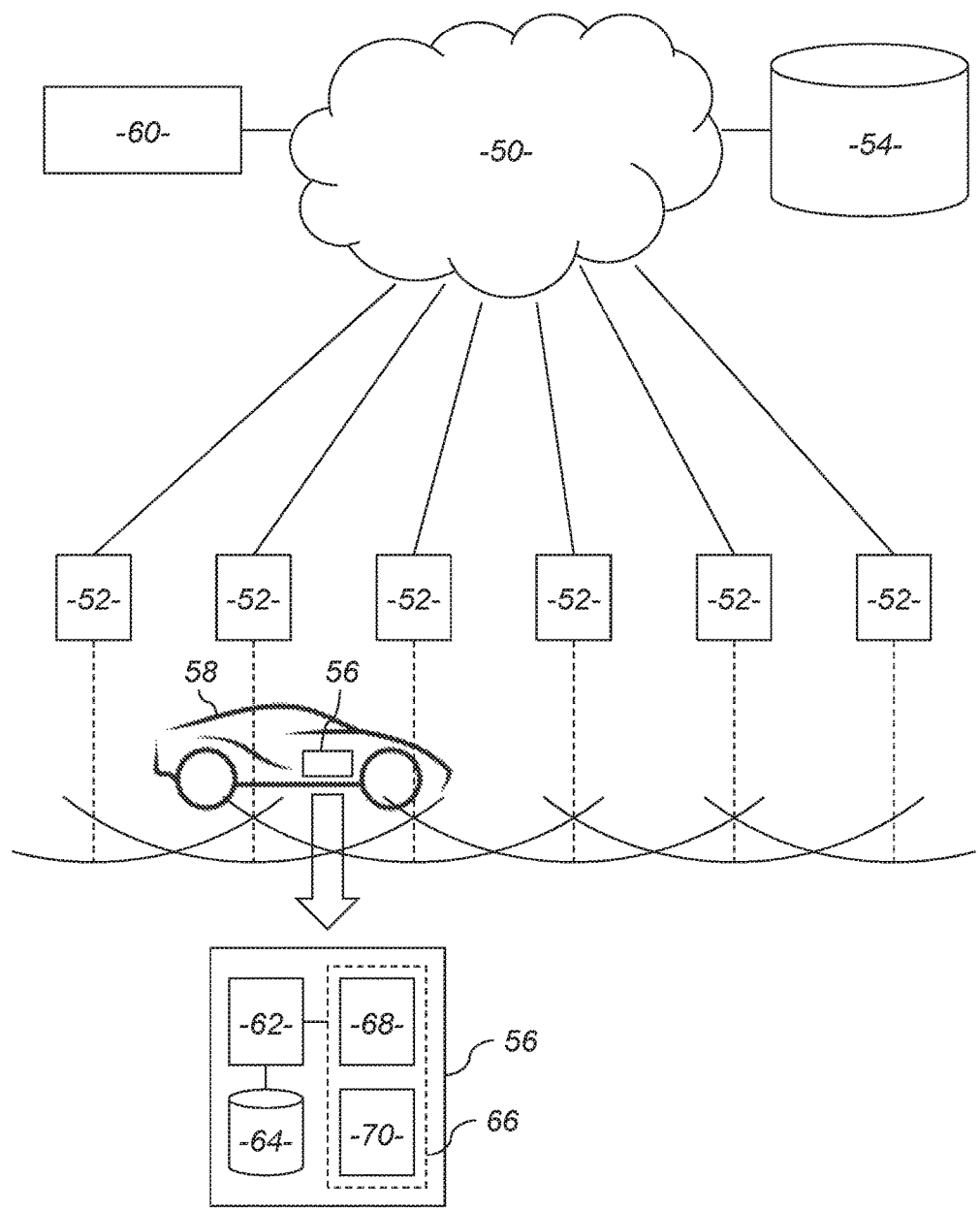

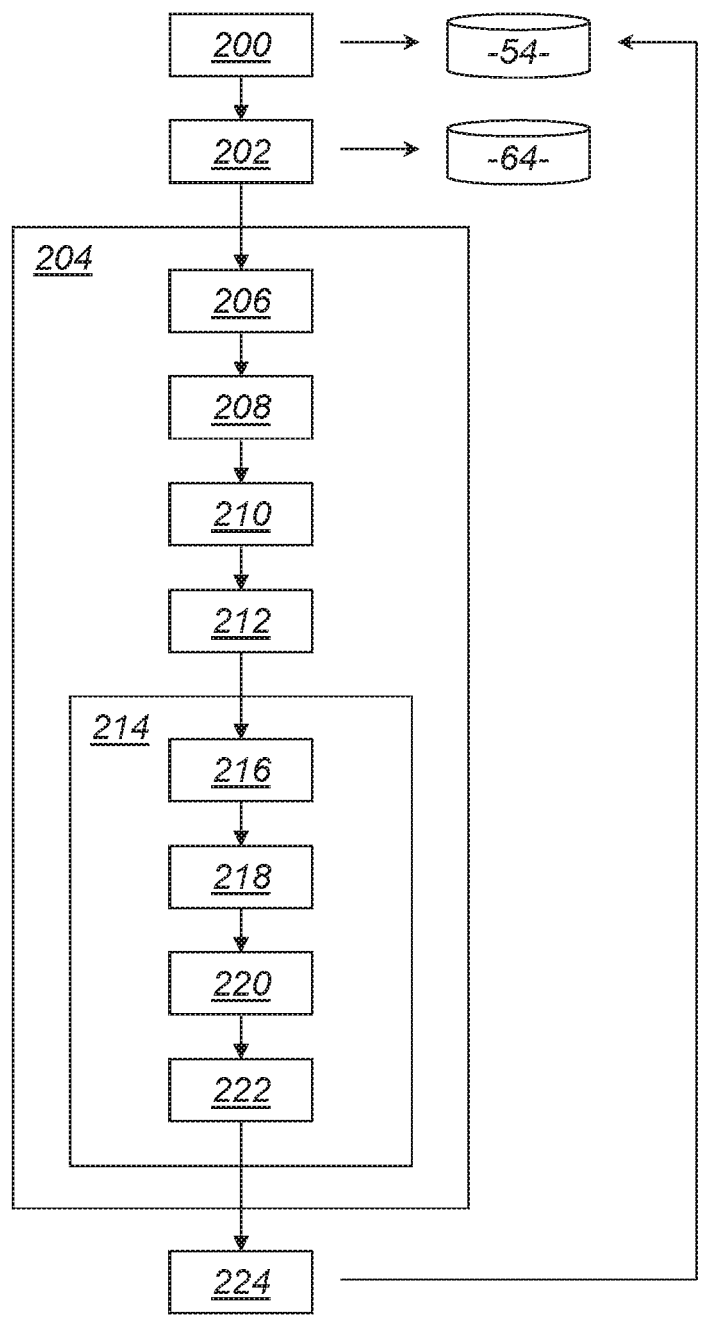

METHOD AND DEVICE FOR SETTING UP AND MAINTAINING AN INTERNET ACCESS USING A WIRELESS LOCAL AREA NETWORK COMMUNICATION PROTOCOL FROM A MOBILE CLIENT STATION

CROSS-REFERENCE TO RELATED APPLICATIONS

This application is the U.S. National Stage of PCT/FR2016/052204, filed Sep. 6, 2016, which in turn claims priority to French patent application number 1558294 filed Sep. 7, 2015. The content of these applications are incorporated herein by reference in their entireties.

This invention refers to a method for setting up and maintaining Internet access using a wireless local area network communication protocol from a mobile client station, by means of a plurality of access points to be chosen in succession over time as a function of movements of the mobile client station, from a set of identified Internet access points using this wireless local area network communication protocol. This invention also refers to a corresponding computer program and device.

The "wireless local area network communication protocol" is referred to as a WLAN (Wireless Local Area Network) protocol.

More specifically, the invention applies to a method comprising the following steps:
  setting up Internet access for the mobile client station using the wireless local area network communication protocol by means of a first access point selected from the set of identified access points,
  at that time, opening a first communication session for the mobile client station specific to that first access point in accordance with the wireless local area network communication protocol, and
  maintaining Internet access for the mobile client station while opening at least one other communication session specific to at least one other access point subsequently selected from the set of identified access points according to the wireless local area network communication protocol.

Methods of this type are known, particularly methods implementing one of the wireless local area network communication protocols standardized by the IEEE 802.11 working group, usually referred to as Wi-Fi (registered trademark) protocols. Numerous Wi-Fi access points offer the benefit of allowing free access to the Internet. But they are generally of limited range. For instance, when the mobile client station moves around, particularly when the station is in a motor vehicle, it is required to connect to a plurality of Wi-Fi access points and lose those connections in succession. At the normal speed of the motor vehicle, each connection to a Wi-Fi access point lasts a short time, on the order of some ten or several tens of seconds in an urban environment, and dead zones between two successive access points are common. Pre-fetching or caching methods have been devised to mask the dead zones and ensure Internet access continuity for data reading and writing.

But these methods are of limited effectiveness when the successive Wi-Fi connections and disconnections are frequent, bearing in mind, in addition, the generally long amount of time it takes to set up these connections. And yet, there has been a marked improvement in these connection times over the past few years and it would be unfortunate not to be able to take advantage of it.

Furthermore, mobile client stations equipped with means of Wi-Fi communication or, more generally, using a wireless local area network communication protocol, are also often equipped with means of communication using a wide area telecommunication network wireless communication protocol, such as one of the protocols standardized under the name 2G, 3G, or 4G. Consequently, as an alternative, one can envision accessing the Internet by these means, since the zones covered by mobile telephone access points are much more extensive. But then Internet access is not free.

Lastly, another solution would consist in anticipating any loss of Wi-Fi connection by searching preventively for another Wi-Fi access point while a Wi-Fi connection is in progress. Unfortunately, this is not always possible.

As such, it may be desirable to provide a method for setting up and maintaining Internet access using a wireless local area network communication protocol from a mobile client station making it possible to avoid at least some of the aforementioned problems and limitations.

Consequently, a method of the aforementioned type is hereby proposed, wherein:
  when the first session is being opened, a main communication session is additionally opened for the mobile client station using a wide area telecommunication network wireless communication protocol,
  this opened main session is maintained for as long as one wishes to maintain access to the Internet for the mobile client station, and
  joining the main session as well as each session specific to each selected access point as dependent upon a same unique session identifier.

In this way, while the successive connections and disconnections from using a wireless local area network communication protocol may be frequent when the mobile client station is moving, making the corresponding communication sessions short lasting, the main session opened by wide area telecommunication network wireless communication can last the entire desired time for the Internet access and link all these short-lasting sessions together under the same unique session identifier. Without losing the main communication session making it possible to keep this unique identifier, it is then possible to exchange data between the mobile client station and the Internet without service interruption, by making maximum use of the successive short-lasting communication sessions while making minimal use of the more costly main session.

Optionally, the unique session identifier is the identifier of a meta-session opened when the first session and the main session are opened, with each session opened when the Internet access is set up and while it is maintained, as well as the meta-session under which these sessions are joined as dependent, being communication sessions identified on the Transport layer of the OSI model for Open Systems Interconnection.

Also optionally, each session opened when the Internet access is set up and while it is maintained is a communication session complying with the TCP protocol.

Also optionally, the meta-session and the sessions joined as dependent thereon are opened in accordance with the Multipath TCP protocol of the IETF working group.

Also optionally, the main session opened using said wide area telecommunication network wireless communication protocol is only used for sending signaling messages serving the function of joining sessions opened when the Internet access is set up and while it is maintained or the function of maintaining the same unique session identifier.

Also optionally, the messages serving the function of maintaining the same unique session identifier are TCP Keepalive messages.

Also optionally, the wireless local area network communication protocol is one of those standardized by the IEEE 802.11 working group.

Also optionally, the wide area telecommunication network wireless communication protocol is one of those standardized under the name 2G, 3G, or 4G.

Also proposed is a computer program downloadable from a communication network and/or stored on a medium readable by a computer and/or executable by a processor, comprising instructions for executing the steps of a method for setting up and maintaining Internet access according to the invention, when said program is executed on a processor of said mobile client station.

Also proposed is a wireless mobile electronic communication device designed to set up and maintain an Internet access using a wireless local area network communication protocol by means of a plurality of access points, to be chosen in succession over time as a function of movements of the mobile electronic device from a set of identified Internet access points using this wireless local area network communication protocol, said device comprising a processor and a programmed Internet access manager which, when executed by the processor:
- sets up Internet access using the wireless local area network communication protocol by means of a first access point selected from the set of identified access points,
- opens at that time a first communication session specific to this first access point in accordance with the wireless local area network communication protocol,
- maintains the Internet access while opening at least one other communication session specific to at least one other access point subsequently selected from the set of identified access points according to the wireless local area network communication protocol, wherein the Internet access manager is programmed more specifically to maintain Internet access in the following way:
- when the first session is being opened, a main communication session is additionally opened using a wide area telecommunication network wireless communication protocol,
- this main session is kept open for as long as maintaining the Internet access is programmed, and
- joining the main session as well as each session specific to each selected access point as dependent upon a same unique session identifier.

The invention will be better understood through the following description provided solely as an example and given in reference to the appended drawings, in which:

FIG. 1 schematically represents the general structure of an installation comprising a mobile device for setting up and maintaining Internet access using a wireless local area network communication protocol according to one embodiment of the invention, FIG. 2 shows the series of steps in a method implemented by the mobile device of FIG. 1, FIG. 3 schematically represents the general structure of a system for setting up an accelerated Internet access using a wireless local area network communication protocol from a mobile client station, and FIG. 4 shows the series of steps in a method implemented by the system of FIG. 3.

PRIMARY ASPECT OF THE INVENTION: SETTING UP AND MAINTAINING INTERNET ACCESS USING A WIRELESS LOCAL AREA NETWORK COMMUNICATION PROTOCOL FROM A MOBILE CLIENT STATION

The installation shown schematically in FIG. 1, created for setting up and maintaining an access to the Internet (identified by reference 10) using a wireless local area network communication protocol (i.e. a WLAN protocol) from a mobile client station, by means of a plurality of access points to be chosen in succession over time as a function of movements of the mobile client station from a set of identified Internet access points using this WLAN protocol, comprises:
- a mobile client station 12 in the form of a mobile electronic device in a motor vehicle 14,
- a set of identified Internet access points using this WLAN protocol, of which only two, AP1 and AP2, are shown in FIG. 1 and are found in succession along a path of the mobile client station 12,
- an Internet server 16 programmed to set up the Internet access of mobile client station 12, first by means of access point AP1, then by means of access point AP2 and so on by means of successive access points until the desired end of the Internet access, and
- at least one Internet access point 18 using a wide area telecommunication network wireless communication protocol.

The WLAN protocol considered in the example shown— in FIG. 1 is, for example, a Wi-Fi protocol of the IEEE 802.11 working group. Note that Wi-Fi access points AP1, AP2, . . . can be managed by one or more Wi-Fi Internet access providers and may or may not require a user name and password.

The wide area telecommunication network wireless communication protocol considered in the example shown in FIG. 1 is, for example, one of the protocols standardized under the name 2G, 3G, or 4G.

Mobile client station 12 as shown schematically in FIG. 1, such as a mobile computer, a mobile telephone, or any other personal digital assistant, comprises a processor 20 associated by conventional means with a memory, such as a RAM. The memory functionally comprises an on-board database 22 and space 24 for storing at least one computer program 26 which can be executed by processor 20. Note that computer program 26 is shown as a single program, but this singular nature is purely functional. It could also consist of any possible combination of one or more software programs. The functions thereof could also be at least in part micro-programmed or micro hardwired in dedicated integrated circuits. For instance, as a variant, mobile client station 12 implementing processor 20 and the associated RAM thereof could consist of an electronic device consisting solely of digital circuits (without a computer program) for completing the same actions.

More specifically, computer program 26 fulfills a function of programmed Internet access manager 10 in order to, when executed on command by processor 20:
- requesting and setting up Internet access using the aforementioned Wi-Fi protocol by means of a first Wi-Fi access point accessible from mobile client station 12 in the course of the travel thereof, for example access point AP1,
- opening at that time a first communication session specific to this first access point AP1 in accordance with the Wi-Fi protocol, maintaining the Internet access by additionally opening a main communication session, when the first session is opened, using the aforementioned 2G, 3G, or 4G mobile telecommunication protocol by means of access point 18, and keeping this main session open for as long as the Internet access is desired by a user of mobile client station 12, joining the main session and the first session specific to access point AP1 as dependent upon a same unique session identifier, when the first session is lost, or possibly even before it is lost, opening another communication session specific to at least another Wi-Fi access point subsequently accessible and selected from mobile client station 12 along the travel path thereof, for example access point AP2, joining the new session specific to access point AP2, to the main session as dependent upon the unique session identifier defined earlier, potentially opening at least one other communication session specific to at least one other Wi-Fi access point subsequently accessible and selected from mobile client station 12 in the course of the travel path thereof, and possibly joining each new session specific to a new Wi-Fi access point, to the main session as dependent upon the unique session identifier defined earlier.

The unique session identifier defined above is, for example, the identifier of a meta-session opened when the first session and the main session are opened, with each session opened when the Internet access is set up and while it is maintained, as well as the meta-session under which these sessions are joined as dependent, being communication sessions identified on the Transport layer of the OSI (Open Systems Interconnection) model.

As an option and advantageously, the meta-session and the sessions joined as dependent thereon are opened in accordance with the Multipath TCP protocol of the IETF working group, with the joined sessions then being communication sessions complying with the TCP protocol.

In order to limit the costs associated with opening the main communication session by 2G, 3G, or 4G mobile telephony, the latter can be used solely for sending signaling messages for the purpose of joining the sessions opened when the Internet access is set up and maintained, or for the purpose of keeping the same unique session identifier, bearing in mind that the messages for keeping the same unique session identifier are, for example, TCP Keepalive messages.

An example of the operation of mobile client station 12 in FIG. 1, according to a scenario complying with the illustration of this FIG. 1, will now be described in detail in reference to FIG. 2.

At a given moment along the travel path followed by motor vehicle 14, for example when said motor vehicle is located in an area covered by access point AP1, manager 26 for managing Internet access 10, running on processor 20 of mobile client station 12, requests Wi-Fi Internet access in step 100. This step is processed by means known per se and will not be described in detail herein. This step, however, may be accelerated advantageously for improved implementation of the invention according to a secondary contextual aspect, which will be described in detail later herein. The step is carried out by selecting a Wi-Fi access point, for example AP1, is continued with an association between AP1 and mobile client station 12 and then by an authentication of the latter, and is completed by a configuration phase assigning an IP (Internet Protocol) address to mobile client station 12.

After that, Wi-Fi Internet access is effectively established during step 102 by means of access point AP1 selected on the basis of the configured IP settings.

At that time, in step 104 a first Wi-Fi communication session specific to this first access point AP1 is opened.

Also at that time, in step 106 a main communication session by 2G, 3G, or 4G mobile telephony is opened for mobile client station 12. This main session is intended to remain open for as long as maintained Internet access is desired.

During a subsequent step 108, the main session and the first session specific to access point AP1 are joined by manager 26 as dependent upon the same unique session identifier in compliance with the Multipath TCP protocol.

During a subsequent step 110, motor vehicle 14 leaves the area covered by access point AP1. The first Wi-Fi communication session is lost, but the main communication session by 2G, 3G, or 4G mobile telephony continues and makes it possible to keep the unique session identifier in order to ensure continuity of service.

Next, in step 112, motor vehicle 14 enters the area covered by access point AP2 and this access point is selected by manager 26 in order to open a new Wi-Fi communication session. In keeping with the Multipath TCP protocol, this new session is joined to the main session as dependent upon the maintained unique session identifier.

Closings and openings of Wi-Fi communication sessions can then follow as dependent upon the maintained unique session identifier, according to the path followed by motor vehicle 14, until step 114 for ending Internet access, during which the last Wi-Fi communication session is closed along with the main session, and the unique session identifier is abandoned.

It is clear that mobile client station 12 in FIG. 1, operating as described in detail in reference to FIG. 2, is capable of maintaining, effectively and at lower cost, an Internet connection set up by means of successive Wi-Fi access points whose coverage areas are not extensive enough to avoid dead zones. In addition, the phases of setting up Wi-Fi communication sessions do not need to be adapted, contrary to other known solutions that are not connection-oriented or resistant to disconnections/reconnections.

In addition, it should be noted that the invention is not limited to the embodiment described above.

In particular, the invention applies to other wireless local area network communication protocols other than Wi-Fi.

Furthermore, the notion of link between communication sessions is not limited to the TCP or Multipath TCP protocol and can be extended to other contexts and protocols (context of voice over IP, for example).

More generally speaking, a person skilled in the art could conceive of various modifications to the embodiment described above, in light of the teaching that has just been presented. In the claims which follow, the terms must not be interpreted as limiting the claims to the embodiment presented in the present description, but rather must be interpreted as including all equivalent measures that the claims are intended to cover, in light of their wording, and which can be foreseen by a person skilled in the art through the application of his/her general knowledge to the implementation of the teaching disclosed above.

SECONDARY CONTEXTUAL ASPECT OF THE INVENTION: ACCELERATED SETUP OF INTERNET ACCESS USING A WIRELESS LOCAL AREA NETWORK COMMUNICATION PROTOCOL FROM A MOBILE CLIENT STATION

The system shown schematically in FIG. 3, created for an accelerated setup of access to the Internet (identified as reference no. 50) using a wireless local area network communication protocol (i.e. a WLAN protocol) from one or more mobile client stations, by means of an access point to be chosen from a set of Internet access points identified as reference no. 52 using this WLAN protocol, comprises:
  a general database 54, accessible via Internet 50, containing all identified access points 52 with connection information specific to each access point,
  at least one mobile client station 56, for example in a motor vehicle 58, and an Internet server 60 programmed to set up the Internet access of mobile client station 56 by means of an access point selected from the set of identified Internet access points 52 on the basis of IP settings configured for mobile client station 56.

The WLAN protocol considered in the example shown in FIG. 3 is, for example, a Wi-Fi protocol of the IEEE 802.11 working group. Note that the Wi-Fi access points of the set of identified access points 52 can be managed by one or more Wi-Fi Internet access providers and may or may not require a user name and password.

Mobile client station 56 as shown schematically in FIG. 3, such as a mobile computer, a mobile telephone, or any other personal digital assistant, comprises a processor 62 associated by conventional means with memory, such as RAM. The memory functionally comprises an on-board database 64 and space 66 for storing computer programs 68 and 70 which can be executed by processor 62. Note that computer programs 68 and 70 are presented as separate, but this separation is purely functional. They could also be grouped together according to any possible combination of one or more software programs. The functions thereof could also be at least in part micro-programmed or micro hard-wired in dedicated integrated circuits. For instance, as a variant, mobile client station 16 implementing processor 62 and the associated RAM thereof could be replaced with an electronic device consisting solely of digital circuits (without a computer program) for completing the same actions.

More specifically, computer program 68 serves a purpose of managing the downloading of connection information for at least a portion of the identified access points in general database 54, into the on-board database 64.

Also more specifically, computer program 70 serves a purpose of Internet access manager 50 which, when executed, is programmed to request access to the Internet using the aforementioned Wi-Fi protocol, by proceeding with the following steps in succession: browsing through at least a portion of the identified access points 52 in order to list the ones detected as accessible to mobile client station 56; selection of one of the access points thus listed; request to associate mobile client station 56 with the selected access point; authentication of mobile client station 56 with the access point which has just been associated therewith; configuration of IP settings of mobile client station 56. The last configuration phase may, for example, be completed according to the DHCP (Dynamic Host Configuration Protocol) or an equivalent.

In accordance with the secondary contextual aspect of the invention, processor 62 is programmed to sequence the execution of download manager 68 and Internet access manager 70 in the following way:
  run download manager 68 independently of and prior to execution of Internet access manager 70,
  run Internet access manager 70 by proceeding with the phases of browsing and selection of the Wi-Fi protocol from the connection information previously downloaded into on-board database 64, without use of general database 54 and identified access points 52.

Processor 62 is also programmed by means known per se so as to participate in setting up Internet access 50 of mobile client station 56 by means of the access point selected by manager 70.

As an option, during this Internet access performance properties of the selected access point can be measured, for example by manager 70 or by Internet server 60. These properties are then sent advantageously to general database 54 for updating of the contents of the database in terms of connection information on this selected access point. Since the system is designed to be solicited at any time and simultaneously by a plurality of mobile client stations, via a plurality of identified access points, this makes it possible to ensure dynamic management of all the content of general database 54 through ongoing learning or feedback.

The connection information of all identified Internet access points 52 in general database 54 comprises more specifically for each access point, at least:
  an identifier, for example BSSID (Basic Service Set IDentifier), of the Wi-Fi access point in question,
  a geographic location or coverage of the Wi-Fi access point in question,
  a preferred communication channel of the Wi-Fi access point in question when it establishes a connection, and
  performance properties of the Wi-Fi access point in question.

The performance properties are defined according to various metrics known per se in order to indicate a quality of service provided by the access point in question for a Wi-Fi connection. These include, for example, RTTs (Round-Trip Times), changes in these RTTs over time, an estimated bandwidth, a maximum flow rate that can be reached, a classification according to several preset classes, the number of which is strictly lower than the number of identified access points, etc. Naturally, this list is neither exhaustive nor limiting.

An example of the operation of the system in FIG. 3 will now be described in detail in reference to FIG. 4.

In step 200 prior to any use of the system, general database 54 is created. This database contains a set of identified access points 52 capable of being solicited by any mobile client station, such as client station 56 in motor vehicle 58. The database associates values corresponding to the aforementioned connection information with each of these identified access points 52. The database is read-accessible via Internet 50 for downloading into on-board databases of client stations, and write-accessible for updating by learning or feedback.

In step 202 prior to any request for Wi-Fi access via Internet 50, download manager 68 is run by processor 62 of mobile client station 56 in order to download connection information of at least a portion of the access points in general database 54, into on-board database 64. This downloading is done independently of any running of Internet access manager 70.

In the example shown in FIG. 3 in which mobile client station 56 is in motor vehicle 58, this can be done when motor vehicle 58 is started, for example when a user defines his/her travel path in an on-board computer. The identified access points in general database 54 likely to be accessed at one moment or another of the travel path are then selected and the connection information thereof is downloaded. The selection can also take into account a preferred Wi-Fi access provider. The downloading can be done again at any time along the travel path, particularly if the travel path is changed along the way.

At a given moment along the travel path, Internet access manager 70 of mobile client station 56 request Wi-Fi Internet access in step 204.

This step 204 includes five successive phases identified by reference nos. 206, 208, 210, 212, and 214.

First phase 206 consists in perusing at least a portion of identified access points 52 in order to list the ones detected as accessible to mobile client station 56. In order to significantly accelerate Wi-Fi access, browsing phase 206 is done advantageously starting with the connection information previously downloaded into on-board database 64. In particular, depending on the geographic location of mobile client station 56 at the time when this browsing phase 206 is executed, as obtained, for example, by GPS (Global Positioning System), browsing through the accessible Wi-Fi access points can be completed without soliciting general database 54 and identified access points 52, by simple comparison between the GPS location obtained and the geographic location or coverage information downloaded into on-board database 64. This browsing can also be done in advance by first associating possible geographic locations of mobile client station 56 with lists of accessible access points from among those downloaded in step 202.

Second phase 208 consists in selecting one of the access points listed in browsing phase 206. In order to significantly accelerate Wi-Fi access, this selection phase 208 is done advantageously from the connection information previously downloaded into on-board database 64, without use of general database 54 and identified access points 52. Thanks to the aforementioned performance properties, for instance, a classification of the access points can be done easily, possibly even ahead of time. In addition, in the event that the access points identified in general database 54 are distributed among predetermined classes, the number of which is strictly less than the number of identified access points 52, this selection phase 208 can be further simplified. This phase then involves selecting a class and then the final selection of an access point in this class from the access points listed in browsing phase 206. To avoid over-use of highly ranked access points, the final selection is done advantageously in a random fashion, in a pseudo-random fashion (for example, using a hash algorithm), or on the basis of workload information on listed access points.

Third phase 210 consists in associating the mobile client station 56 with the access point selected in second phase 208. This association phase 210 is known per se and will not be described in detail. This phase primarily consists in mobile client station 56 issuing an association request and receipt of an acknowledgment issued by the selected access point in response to the request.

Fourth phase 212 consists in authenticating the mobile client station 56 with the access point which has just been associated therewith. By means known per se, this authentication phase 212 comprises the use of time-delay parameters. But in general, these time delays are on the order of a few tens of seconds, or even a minute. In accordance with an advantageous embodiment, these time delays are reduced so as to be always equal to or less than 5 seconds. In this way, authentication phase 212 is statistically accelerated. As a non-limiting example, the authentication can be done by the EAP protocol (Extensible Authentication Protocol).

Fifth phase 214 consists in configuring the IP settings of mobile client station 56 and other typical configuration settings needed to set up Internet connection 50. This phase can be completed with the DHCP protocol. By means known per se, this configuration phase 214 comprises the use of time-delay parameters, particularly backoff times. But in general, these time delays are on the order of a few seconds and the backoff times have a linear or exponential growth. In accordance with an advantageous embodiment, these time delays are reduced so as to be always equal to or less than 500 milliseconds. As for the backoff times, they are defined so as to remain constant. In this way, configuration phase 214 is statistically accelerated.

More specifically, for example in accordance with the DHCP protocol, configuration phase 214 in turn comprises four steps: broadcasting 216 of a request for an IP address in the network by mobile client station 56, then proposal 218 of an IP address, for example by Internet server 60, then query 220 for the proposed IP address, then acknowledgment 222 for validation of this IP address. By means known per se, this configuration phase can be carried out a plurality of times in the event of successive failures. According to an advantageous embodiment, in a first implementation of this configuration phase 214 in access request 204, the first two steps of broadcasting 216 and IP address proposal 218 are not carried out, with request step 220 for the proposed IP address being capable of being based on an IP address granted at the time of a previous access request. This feature takes advantage of the fact that an IP address is generally allocated for a period extending beyond the average duration of a Wi-Fi connection, especially when the connection is obtained in the context of FIG. 3, that is, for mobile client station 56 in motor vehicle 58. In this way, configuration phase 214 is statistically accelerated.

Following execution of configuration phase 214, step 204 requesting Wi-Fi Internet access is completed and is followed by step 224 for actual setup of the Wi-Fi Internet access of mobile client station 56 by means of the selected access point on the basis of the configured IP settings. As indicated earlier, during the Wi-Fi connection obtained in step 224, performance properties of the selected access point can be measured and sent to general database 54 for an update.

It is clear that a system for setting up Internet access using a wireless local area network communication protocol from a mobile client station such as that described earlier in reference to FIGS. 3 and 4, makes it possible to substantially reduce the time of Wi-Fi Internet access request. While, as a general rule, a Wi-Fi access time is on the order of 9 to 14 seconds, it can be reduced to at most 1.5 seconds, and even less than one second, thanks to the system described above.

This advantage is particularly significant for applications in which the client station is highly mobile, particularly when the client station is in a motor vehicle, since in such cases the Wi-Fi connection time can be very short, namely on the order of ten or several tens of seconds in an urban environment.

It should be noted, however, that although the present invention can take advantage of such a system according to the second contextual aspect described above in order to improve the efficiency thereof, this is not indispensable. The technical effect produced by the invention is independent of this secondary aspect.

The invention claimed is:

1. A method for setting up and maintaining an access to the Internet using a wireless local area network communication protocol from a mobile client station, by means of a plurality of access points to be chosen in succession over time as a function of movements of the mobile client station, from a set of identified Internet access points using this wireless local area network communication protocol, said method comprising:
   setting up access to the Internet for the mobile client station using the wireless local area network communication protocol by means of a first access point selected from the set of identified access points,
   at that time, opening a first communication session for the mobile client station specific to this first access point in accordance with the wireless local area network communication protocol,
   maintaining access to the Internet for the mobile client station while opening at least one other communication session specific to at least one other access point subsequently selected from the set of identified access points according to the wireless local area network communication protocol,
wherein the Internet access is maintained as follows:
   when the first communication session is being opened, a main communication session is additionally opened for the mobile client station using a wide area telecommunication network wireless communication protocol,
   the opened main communication session is maintained for as long as one wishes to maintain access to the Internet for the mobile client station, and
   joining, by the mobile client station, the main communication session as well as each session specific to each selected access point as dependent upon a same unique session identifier.

2. The method for setting up and maintaining access to the Internet as claimed in claim 1, wherein the unique session identifier is the identifier of a meta-session opened when the first communication session and the main communication session are opened, with each session opened when the access to the Internet is set up and while it is maintained, as well as the meta-session under which the sessions are joined as dependent, being communication sessions identified on the Transport layer of the OSI model for Open Systems Interconnection.

3. The method for setting up and maintaining access to the Internet as claimed in claim 2, wherein each session opened when the Internet access is set up and while it is maintained is a communication session complying with the TCP protocol.

4. The method for setting up and maintaining access to the Internet as claimed in claim 3, wherein the meta-session and the sessions joined as dependent thereon are opened in accordance with the Multipath TCP protocol of the IETF working group.

5. The method for setting up and maintaining access to the Internet as claimed in claim 1, wherein the main communication session opened using said wide area telecommunication network wireless communication protocol is only used for sending signaling messages serving the function of joining sessions opened when access to the Internet is set up and while it is maintained or the function of maintaining the same unique session identifier.

6. The method for setting up and maintaining access to the Internet as claimed in claim 5, wherein the messages serving the function of maintaining the same unique session identifier are TCP Keepalive messages.

7. The method for setting up and maintaining access to the Internet as claimed in claim 1, wherein the wireless local area network communication protocol is one of those standardized by the IEEE 802.11 working group.

8. The method for setting up and maintaining access to the Internet as claimed in claim 1, wherein the wide area telecommunication network wireless communication protocol is one of those standardized under the name 2G, 3G, or 4G.

9. A non-transitory computer readable medium comprising instructions for executing the steps of a method for setting up and maintaining access to the Internet as claimed in claim 1, when said instructions are executed on a processor of said mobile client station.

10. A wireless mobile electronic communication device designed to set up and maintain an access to the Internet using a wireless local area network communication protocol by means of a plurality of access points, to be chosen in succession over time as a function of movements of the mobile electronic device from a set of identified Internet access points using the wireless local area network communication protocol, said device comprising a processor and a programmed Internet access manager which, when executed by the processor:
   sets up access to the Internet using the wireless local area network communication protocol by means of a first access point selected from the set of identified access points,
   opens at that time a first communication session specific to this first access point in accordance with the wireless local area network communication protocol,
   maintains the access to the Internet while opening at least one other communication session specific to at least one other access point subsequently selected from the set of identified access points according to the wireless local area network communication protocol,
wherein the Internet access manager is programmed to maintain access to the Internet in the following way:
   when the first communication session is being opened, a main communication session is additionally opened using a wide area telecommunication network wireless communication protocol,
   the main communication session is kept open for as long as maintaining access to the Internet is programmed, and
   joining the main communication session as well as each session specific to each selected access point as dependent upon a same unique session identifier.

* * * * *